United States Patent [19]
Culver

[11] Patent Number: 4,712,101
[45] Date of Patent: Dec. 8, 1987

[54] CONTROL MECHANISM FOR ELECTRONIC APPARATUS

[75] Inventor: Craig F. Culver, Woodside, Calif.

[73] Assignee: Cheetah Control, Inc., Woodside, Calif.

[21] Appl. No.: 677,703

[22] Filed: Dec. 4, 1984

[51] Int. Cl.$^4$ .............................................. G09G 1/00
[52] U.S. Cl. .................................. 340/710; 340/706; 74/471 XY
[58] Field of Search ........................ 390/709, 710, 706; 178/18; 74/471 XY, 471 R, 198, 491; 338/123, 132, 133

[56] References Cited

U.S. PATENT DOCUMENTS

| | | | |
|---|---|---|---|
| 1,613,994 | 1/1927 | Grose | 338/123 |
| 3,820,641 | 6/1974 | Borst et al. | 74/471 R |
| 3,838,211 | 9/1974 | Joannou | 178/18 |
| 3,916,100 | 10/1975 | Azuma | 178/18 |
| 4,369,439 | 1/1983 | Broos | 340/710 |
| 4,521,772 | 6/1985 | Lyon | 340/710 |
| 4,543,571 | 9/1985 | Bilbrey et al. | 340/709 |
| 4,561,183 | 12/1985 | Shores | 340/710 |
| 4,562,347 | 12/1985 | Hovey et al. | 74/471 XY |

FOREIGN PATENT DOCUMENTS 0066710 5/1979 Japan .................................... 178/18

OTHER PUBLICATIONS

Leon, N.; "Thumbwheel Positional Control Unit", IBM Technical Disclosure Bulletin, vol. 27, No. 7, Dec. 1978, pp. 3026, 3027.

Primary Examiner—John W. Caldwell, Sr.
Assistant Examiner—Alvin Oberley
Attorney, Agent, or Firm—Nathan N. Kallman; Alan H. MacPherson

[57] ABSTRACT

An improved controller for use in adjusting certain electrical and other values, such as a pair of electrical signals which can be used to actuate a circuit for performing a specific function, such as moving the cursor of a CRT display of a computer. The mechanism includes a rotatable shaft having a cylinder mounted thereon. The cylinder moves with the shaft as the shaft rotates, and the cylinder can move longitudinally of and relative to the shaft. A first encoder responsive to the rotation of the shaft is used to adjust a first electrical signal; and a second encoder responsive to the linear motion of the cylinder relative to the shaft is used to adjust a second electrical signal. When the first and second signals are applied to the mouse inputs of a computer, the cursor on the CRT display of the computer can be shifted around as a function of the rotation of the shaft and the linear motion of the cylinder. Other types of apparatus can be controlled by the mechanism.

21 Claims, 12 Drawing Figures

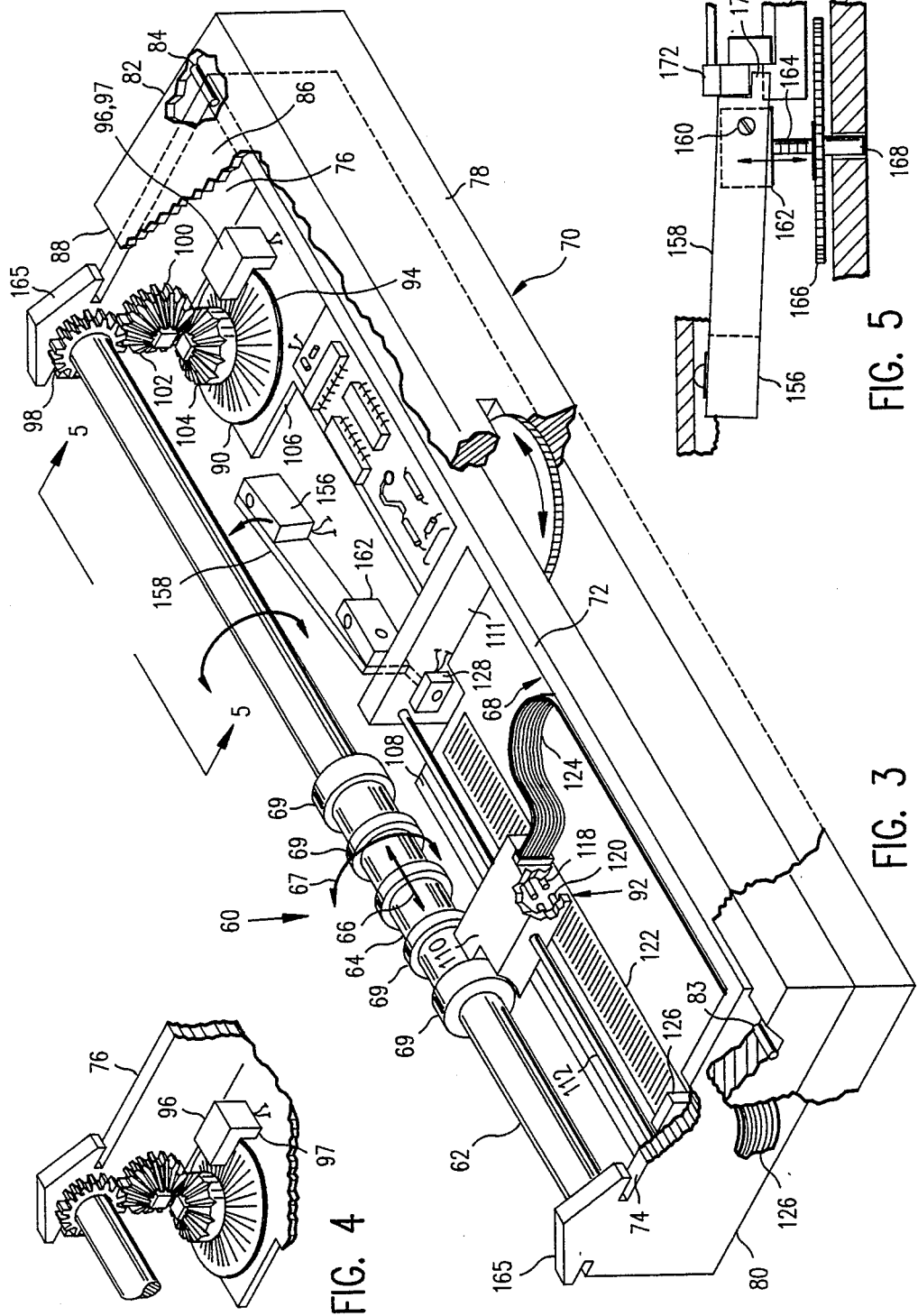

CONTROL MECHANISM FOR ELECTRONIC APPARATUS

This invention relates to improvements in accessories for electronic apparatus capable of being controlled by several electrical or other variables and more particularly, to a control device having a number of different uses, such as for controlling the mouse inputs of a computer.

BACKGROUND OF THE INVENTION

It is common practice on many computers to use a device known as a mouse for moving a pointer or cursor on the CRT display of the computer into various positions on the display for one or more purposes. Such a mouse is a small hand-held box-like device which is coupled by a cable to the computer and which requires a flat, smooth surface over which the mouse can move in an X direction, a Y direction, or in a combination of X and Y directions.

While a mouse of the type described is satisfactory for many applications and uses of a computer, it has been found to be limiting in the sense that a mouse requires the full use of one hand in order to be moved over a surface for controlling the pointer on the CRT display of the computer. This may be a drawback when it is desired to use both hands on the keyboard of the computer and when it is desired not to shift the eyes from the display to the mouse. Thus, it would be advantageous if the hands could be used at all times on the keyboard while still having the advantages of a mouse.

When using a mouse, the surface over which the mouse must move is an essential part of the system. At times, portable computers are placed on the lap of the user and no such surface for the mouse is available. Thus, for a conventional mouse, the surface must be provided; otherwise, the mouse cannot be used with the computer while it is lap-mounted or in cases where no adjacent surface is available for operating the mouse.

Because of these and other drawbacks associated with a conventional mouse, a need has existed for improved apparatus which allows for the advantages of a mouse while allowing the hands to remain on the keyboard and without requiring a flat work surface of the type now required for a conventional mouse. The mechanism of the present invention satisfies this need.

SUMMARY OF THE INVENTION

The mechanism of the present invention provides for the precise and convenient adjustment of two related or distinct electrical or other values with integrated switching of one or more binary states associated with the primary values being adjusted. Thus, the present invention, while it is especially suited for use in providing the effects of a mouse with a computer, is also sufficiently versatile so as to be suitable for a wide variety of applications. As a computer keyboard mouse, the mechanism provides control over vertical and horizontal movements of a cursor on a CRT display of the computer with associated mouse switch functions.

The mechanism is also suitable for use as a specialized computer mouse, such as one operable by the feet or other limb for use by the physically handicapped who may lack use of hands or for whom a desktop mouse operation is not practical. Other uses include industrial applications for the control of machinery and instruments in which the integrated adjustment of two analog functions is required; use as a video game controller as a substitute for track balls and joysticks; and use for control of electronic consumer products, such as a bass-treble integrated tone control or a left-right balance/volume control.

The mechanism of the present invention includes a rotatable shaft on which is mounted a freely slidable member, preferably a cylinder. The cylinder is frictionally or otherwise coupled to the shaft so that the cylinder rotates with the shaft yet the cylinder can be shifted longitudinally of the shaft while the shaft is stationary or while the shaft is being rotated. A first analog value is adjusted by rotation of the shaft or cylinder in either of opposed directions. A second analog value is adjusted by moving the cylinder along the shaft in either direction. When the mechanism of the present invention is used with a computer to adjust the position of a pointer or a cursor on the CRT display of the computer, the analog value associated with the rotation of the shaft and cylinder can be used to control the vertical position of the cursor, and the analog value associated with the linear movement of the cylinder can be used to control the horizontal position of the cursor, the vertical and horizontal positions being most logically controlled by a mouse in a typical computer application.

When used with a computer, the mechanism of the present invention can be mounted in any suitable location, such as on the keyboard of the computer near the front end or adjacent to the lower keys of the bank of keys on a keyboard. In the alternative, the mechanism could be above the keys; however, the mechanism is more practically mounted near the lower part of the keys so that the fingers, thumb or palm of one hand can rotate the shaft and manipulate the cylinder while the fingers of both hands are left free to operate the keys of the keyboard.

The mechanism can be constructed so that, with a slight downward pressure on the shaft or cylinder, a binary switch can be actuated for enabling a circuit of the apparatus with which the mechanism is associated. Such switch can be located in several different positions. The mechanism can also be provided with an adjustment means to raise and lower the shaft and cylinder so as to accommodate the preference of the user as to the most comfortable positions of these components. Moreover, the mechanism can be provided with a mounting frame having a support plate on which the palm of the hand can rest to increase the comfort of the hand and wrist while the keyboard and mechanism are being used.

The mechanism of the present invention can be coupled to the keyboard housing and to the mouse circuitry of a computer associated with the keyboard without substantially modifying the housing or circuitry and without appreciably adding to the weight and bulk of the computer system. It is adaptable for keyboards of different designs and can be used in place of or as an adjunct to a conventional mouse. The mechanism of the present invention can be made from commercially available materials at minimum cost and can be assembled to new or existing keyboards quickly and easily and be immediately ready for use without special talents on the part of the user. It can also be connected directly to a computer without being coupled in any way to the keyboard of the computer.

The primary object of the present invention is to provide an improved control mechanism adapted to provide precise and convenient adjustment of two related or distinct analog electrical or other values so as to render the mechanism suitable for a wide variety of applications including use as a mouse of a computer.

Another object of the present invention is to provide an improved mechanism of the type described wherein the mechanism can be used with a computer in such a way as to permit one-hand control of a cursor on the CRT display of the computer while the fingers of the hand are left free to perform other functions, such as to manipulate the keys of a keyboard to thereby add to the capability of the user to operate a computer with comfort and ease while improving the interest and response of the user and thereby add to the enjoyment of the user in operating the computer.

Other objects of this invention will become apparent as the following specification progresses, reference being had to the accompanying drawings for illustrating several embodiments of the invention.

IN THE DRAWINGS:

FIG. 1 a perspective view of a computer keyboard showing the way in which the control mechanism of the present invention can be mounted thereon at a location near the front of the keyboard;

FIG. 3 is an enlarged, perspective view, partly broken away and in section, of a second embodiment of the control mechanism of the present invention;

FIG. 4 is an enlarged, fragmentary view of the mechanism, showing an encoder for converting rotary movement of a shaft of the mechanism into electrical signals;

FIG. 5 is a side elevational view, partly in section, looking in the direction of line 5—5 of FIG. 3;

Figure 1:
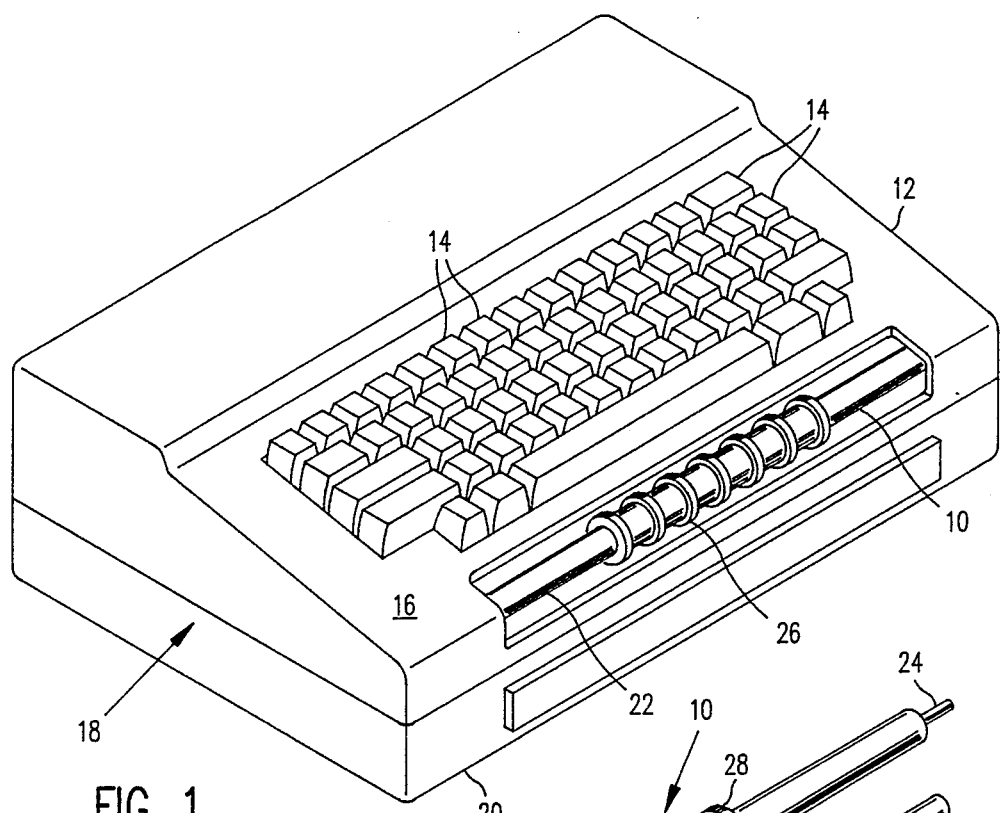
Figure 2:
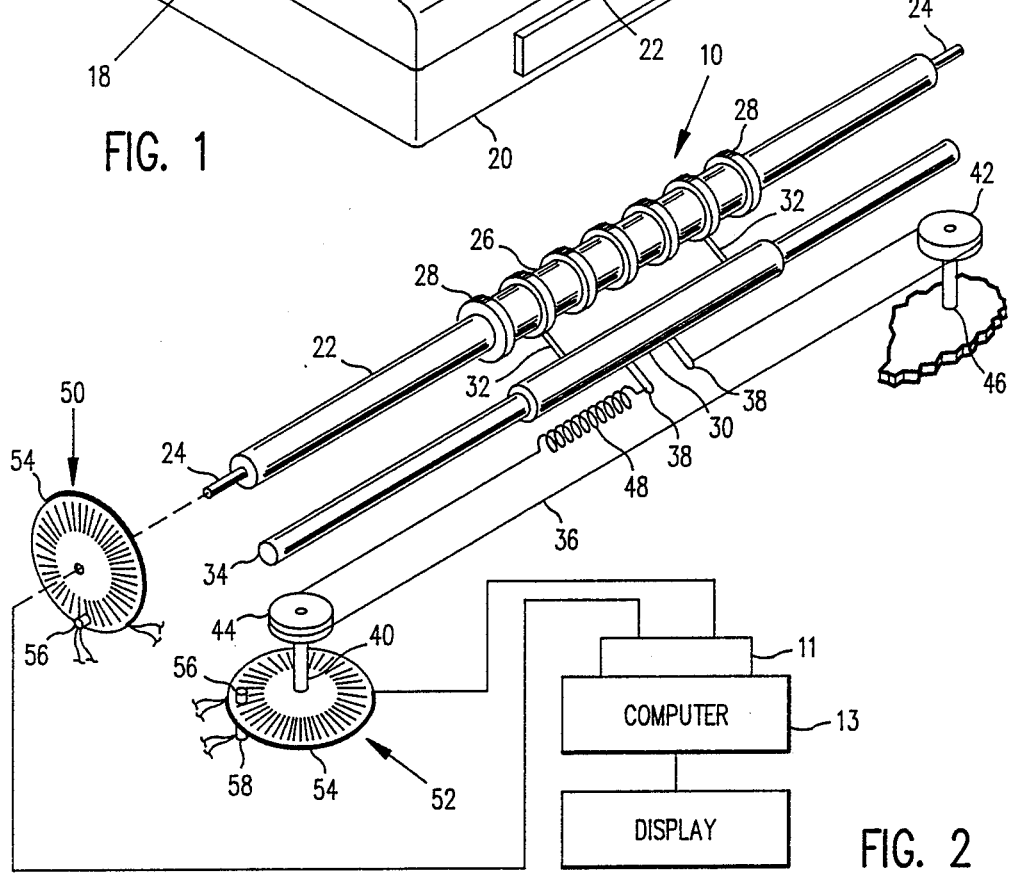
FIG. 2 is a fragmentary, perspective view of a first embodiment of the control mechanism of the present invention showing schematically the way in which the mechanism is coupled to the mouse inputs of a computer.

A first embodiment of the mechanism of the present invention is shown in FIGS. 1 and 2 and is broadly denoted by the numeral 10. For purposes of illustration, mechanism 10 as shown in FIG. 1 as being used with a computer keyboard 12, having a plurality of keys 14 carried on the upper surface 16 of support or housing 18, having a front face 20. Mechanism 10 is located adjacent to front face 20 near the front end of surface 16. In such a position, mechanism 10 can be operated by the fingers, thumb or palm of either hand. When so operated, mechanism 10 permits the fingers of both hands to be substantially free to manipulate keys 14 in the operation of keyboard 12.

It is to be understood that, while mechanism 10 and other embodiments of the present invention will be described as being coupled to the mouse inputs of a computer, such embodiments can be used to control variable values associated with other types of apparatus, such as a video game controller, a bass-treble integrated tone controller or a left-right balance/volume control.

Mechanism 10 provides a precise and convenient means for adjustment of two related or distinct analog electrical or other values or parameters. When coupled with the mouse inputs 11 of a computer 13 having a CRT display 15, mechanism 10 operates as a mouse for controlling the positions and movements of a mouse-driven pointer or cursor on the CRT display. The way in which signals are adjusted by the use of mechanism 10 to cause the cursor to move in an X-Y plane on display 15 will be set forth hereinafter.

Mechanism 10, as shown in FIG. 2, includes a rotary shaft 22 having pins 24 at the ends thereof for mounting the shaft for rotation in any suitable manner in housing 18. While mechanism 10 is shown at the front end of the housing in FIG. 1, it is possible to mount the mechanism at a location on the housing rearwardly of the top row of keys 14. The location of the mechanism will be selected on the basis of convenience and comfort of the user of the keyboard as well as the availability of space as dictated by the particular design of the keyboard itself. Generally, however, the mechanism will be near the front of the keyboard as shown in FIG. 1. It is possible that mechanism 10 could be used without attachment to a keyboard. In such a case, the mechanism could be placed on a surface or held in the hand.

A tubular member or cylinder 26 is coupled to shaft 22 and is rotatable therewith. Moreover, cylinder 26 is shiftable in either direction, axially of the shaft. The cylinder has external, annular ribs 28 thereon to enhance the control between the palm or fingers of a hand and the cylinder itself.

A tube 30 is coupled by pins 32 to cylinder 26 for movement with the cylinder longitudinally of shaft 22, yet pins 32 permit rotation of cylinder 26 about shaft 22 relative to tube 30. To permit this rotational movement, each pin 32 may, for instance, have a curved, outer part (not shown) for partially embracing the outer surface of cylinder 26.

Tube 30 is mounted on a rod 34, secured at its end thereof in any suitable manner to housing 18. Rod 34 is generally parallel to shaft 22 and provides a guide for tube 30 to allow the tube to shift with cylinder 26 longitudinally of shaft 22.

A flexible line 36 is secured at its ends to pins 38 projecting laterally from tube 30 as shown in FIG. 2. Line 36 is partially wrapped around pulleys 40 and 42 mounted on stub shafts 44 and 46, respectively, shafts 44 and 46 being rotatably mounted on support 18 in any suitable manner. A coil spring 48, coupled with one end of line 36, maintains tension in the line since the spring itself is under tension.

Encoders 50 and 52 are coupled to shaft 20 and cylinder 26, respectively, to cause the adjustment of respective electrical signals as a function of the rotary movement of shaft 22 and the linear movement of cylinder 26 relative to support 18. These encoders may be of any suitable construction. For purposes of illustration, the encoders are both of the same type, namely, the opto-electronic type, each encoder having a rotary commutator or disk 54 adjacent to a pair of light sources 56 and a pair of photo cells 58. If each disk has a plurality of circumferentially spaced, radial slots, each light source will be on one side of the disk and its photo cell will be on the opposite side. If the disk is provided with circumferentially spaced, radial light-reflecting lines around the outer periphery of the disk, each light source and its photo cell will be on the same side of the disk. A pair of light sources and their respective photo cells are provided to provide a quadrature output to indicate the magnitude and direction of rotation of shaft 22 and the magnitude and direction of linear movement of cylinder 26.

Disk 54 of encoder 50 is connected directly to the shaft 22 so that the disk rotates with the shaft in either direction. As the disk 54 of encoder 50 rotates with shaft 22, the slots or lines in the disk pass or reflect the light beams from the pair of light sources 56, and the light beams pass to respective photo cells 58 to produce the quadrature output in which two pulse trains, nominally 90 degrees out of phase, are detected when the disk rotates with shaft 22. The quadrature output then provides the means for determining the magnitude and direction of rotation of shaft 22. Similarly, when cylinder 26 moves along shaft 22 in either direction, disk 54 of encoder 52 rotates to produce the quadrature output from the respective photo cells 58. This quadrature output indicates the magnitude and direction of the movement of cylinder 26 along shaft 22.

In the operation of mechanism 10, with the mechanism mounted in place in an operative position on keyboard 12, such as shown in FIG. 1, the user of the keyboard can manipulate keys 14 with the fingers of one hand while the thumb or palm of the hand can rotate shaft 22 and can move cylinder 26 along the shaft. As the shaft rotates, it will cause a quadrature output to be generated by encoder 50, and this output can be used, for instance, to control the vertical movement of a pointer or cursor on the CRT display 15 of the computer. The quadrature output of encoder 50 is also used to indicate the magnitude and direction of rotation of shaft 22 relative to housing 18.

Similarly, the linear movement of cylinder 26 along shaft 22 will cause a quadrature output to be generated by encoder 52, and this output can be used, for instance, to control the movement of the pointer or cursor in a horizontal direction, the quadrature output of encoder 52 being used to indicate the magnitude of the movement and whether the cylinder is moving to the left or to the right when viewing FIG. 2. In this way, mechanism 10 can be used as a mouse to simultaneously control the vertical and horizontal movements of the cursor and thereby avoid the need for a smooth, flat work surface on which a conventional mouse must be used. Mechanism 10 can be used by the left hand or the right hand, generally by the thumb or palm engaging cylinder 26 for controlling both rotation of shaft 22 and translation of cylinder 26.

Purely vertical movements of the cursor can be achieved by rotation of the shaft 22 without linear movement of the cylinder 26. Purely horizontal movement of the cursor can be achieved by applying braking pressure by the fingers to shaft 22 to restrict its rotation while shifting cylinder 26 along the shaft. For compound X-Y movements of the cursor, the rolling and sliding movements of the shaft and cylinder, respectively, are combined at the point of contact of the shaft and cylinder and the hand.

Cylinder 26 may transfer its rotational motion to shaft 22 in one of two ways:

1. The cylinder may be frictionally coupled to the shaft in which the friction between the shaft and cylinder is sufficient to overcome any friction between the shaft, its end bearings and encoder 50.

2. The cylinder can be keyed to the shaft by means of one or more longitudinal grooves in the shaft, and the cylinder may be provided with keys, splines or ribs in the grooves.

In either of these two configurations, rotation of either the shaft or the cylinder will cause adjustment of signals by encoder 50, yet the cylinder is free to slide along the shaft to cause adjustment of electrical signals by encoder 52, either independently of the generation of the signals of encoder 50 or simultaneously therewith.

A second embodiment of the control mechanism of the present invention is shown in FIG. 3 and is broadly denoted by the numeral 60. Mechanism 60 includes a rotary shaft 62 on which is shiftably mounted a tubular member or cylinder 64 which can move in the direction of arrows 66 longitudinally of shaft 62 and in the direction of arrows 67 with shaft 62 about the longitudinal axis of the shaft. The cylinder has spaced, annular ribs 69 to enhance manual engagement with the cylinder.

Mechanism 60 includes a first, generally U-shaped frame 68 which is pivotally coupled to a second, generally U-shaped frame 70. First frame 68 includes a relatively long, normally lower side member 72 and a pair of relatively short end members 74 and 76 coupled at their lower ends to lower member 72 and extending generally upwardly therefrom.

Figure 7A:
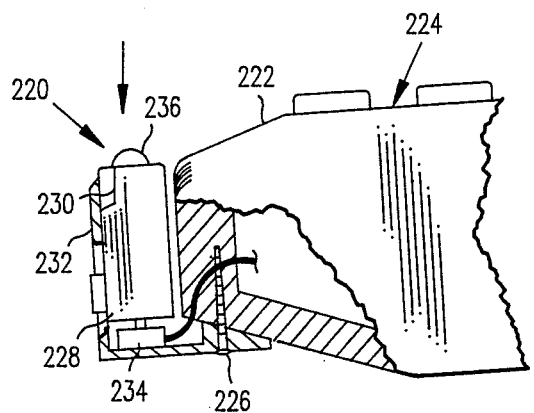
FIGS. 7A, 7B and 7C are fragmentary, side elevational views, partly in section, showing three different ways to mount the mechanism of the present invention on the front end of a computer keyboard.
Figure 7B:
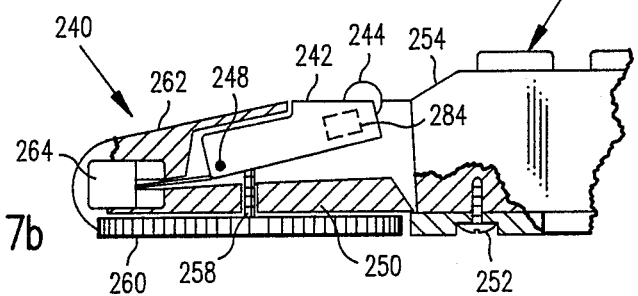
Figure 7C:
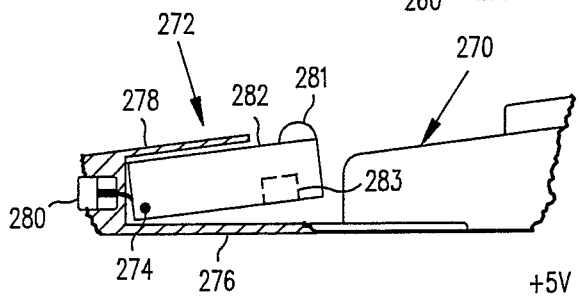

Second frame 70 includes a lower side member 78, generally parallel with lower side member 72 of frame 68, and a pair of end members 80 and 82 parallel with and adjacent to end members 74 and 76. First frame 68 is pivotally mounted by pins 83 and 84 on second frame 70, the pins extending laterally and outwardly from the ends of lower side member 72 and pivotally received within end members 80 and 82, respectively. Frame 70 is adapted to be mounted in any suitable manner in an operative position, such as on housing 18 of computer keyboard 12. Several ways of accomplishing such mounting are shown in FIGS. 7A, 7B and 7C. When mounted on a keyboard, mechanism 60 will be used to control the movements of a pointer or cursor on the CRT display of the computer associated with the keyboard. The mechanism may be mounted elsewhere, such as beneath the CRT display or on the playing console of a video game machine.

Second frame 70 has a cover plate 86, only partially shown in FIG. 3, the plate extending between end members 80 and 82 and extending upwardly from lower side member 78, the plate terminating at an upper marginal edge 88 spaced from but adjacent to shaft 62 and cylinder 64. Cover plate 86 is adapted to permit the user to rest the palm of a hand on the plate as the fingers manipulate cylinder 64 to rotate shaft 62 and to cause linear shifting of the cylinder in opposed directions.

Rotary movements of shaft 62 are sensed by first encoder 90, and linear movements of cylinder 64 are sensed by a second encoder 92. First encoder 90 includes a commutator or disk 94 having a pair of light sources 96 and respective photo cells 97, the light sources and photo cells either being on the same side of the disk (FIG. 3) or on opposite sides of the disk (FIG. 4), such as in the manner described above with respect to the encoders of FIG. 2. The two light sources and their photo cells are circumferentially spaced apart to permit the generation of a quadrature output of type described with respect to the operation of mechanism 10 (FIG. 2). This quadrature output provides a means for determining the magnitude and direction of rotation of shaft 62 relative to frame 70.

FIGS. 3 and 4 show the way in which shaft 62 is coupled to disk 94. To this end, a spur gear 98 is mounted on one end of the shaft and the spur gear mates with a second gear 100 rotatably mounted on end member 76 of frame 68. Gear 100 has a bevel gear 102 in mesh with another bevel gear 104 whose shaft is rigidly coupled to and concentric with disk 94. Thus, as shaft 62 rotates, disk 94 will also rotate in a corresponding direction.

The disk 94 is rotatably coupled to a back plate 106 forming a part of frame 68, the back plate extending between end members 74 and 76 as shown in FIG. 3. The upper margin 108 (FIG. 3) of the back plate is sufficiently spaced from the ribs of cylinder 64 so as not to interfere with the rotation or translation of the cylinder.

Encoder 92 includes a follower 110 which is coupled in some suitable manner to cylinder 64 to allow the cylinder to rotate relative to the follower, yet the follower is movable linearly with the cylinder relative to shaft 62. Follower 110 is slidably mounted on a rigid guide rod 112 secured at its ends to end member 74 of frame 68 and to a post 111 rigid to and extending upwardly from lower side member 72 of frame 68. Rod 112 is generally parallel to shaft 62. For purposes of illustration, follower 110 has a curved upper part 114 which loosely fits between a pair of ribs 69 of cylinder 64, the loose fit permitting cylinder 64 to rotate relative to follower 110 but causing the follower to shift with the cylinder longitudinally of shaft 62.

Follower 110 includes a pair of light sources 118 and a pair photo cells 120, there being a photo cell for each light source 118, respectively. The photo cells are adapted to sense light reflected from a linear encoding strip 122 secured in any suitable manner to the back plate 106 as shown in FIG. 3. Encoding strip 122 has a row of spaced, parallel, light reflecting lines which reflect the light beams and produce a quadrature output relating to the magnitude and direction of movement of the cylinder 64 relative to shaft 62. The signals from the photo cells 120 are carried by a flexible, multiple conductor 124, one end of which is coupled to frame 70 and passes out of the frame to present an end 125, and the other end of the conductor being coupled to follower 110 for movement therewith longitudinally of rod 112.

Alternatively, follower 110 may itself be affixed to frame 68 and the encoder strip 122 may then be connected so as to move with cylinder 64. Such an encoder strip would be flexible so that it could be rolled back upon itself at one end. The advantage of this arrangement would be to eliminate conductor 124. Also, encoder strip 122 could have spaced slots therethrough instead of light reflecting lines. In such a case, the photo cells 120 would be on the opposite side of strip 122 from the light sources 118.

Figure 8:
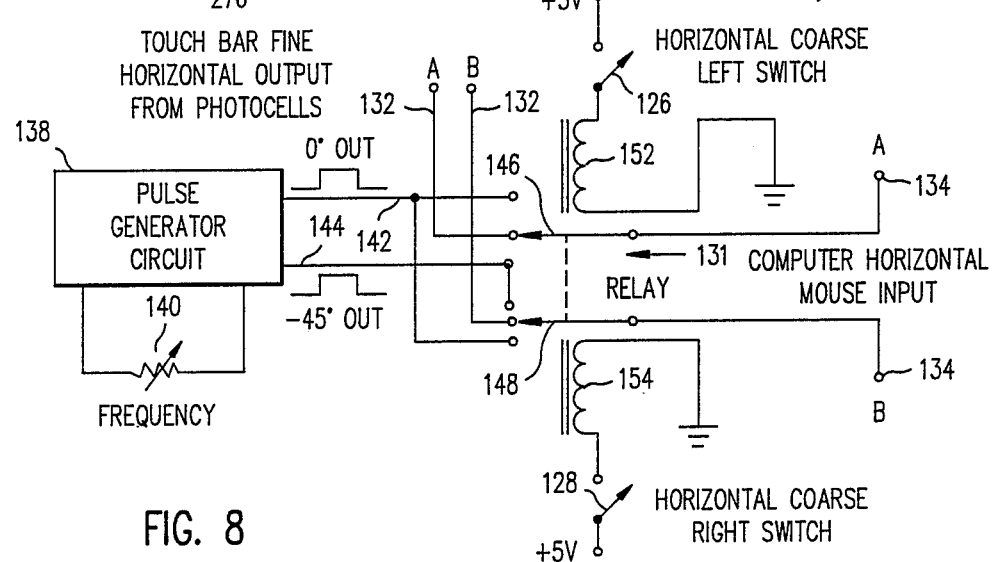
FIG. 8 is a schematic view of a circuit for generating pulses for use in simulating the movements of the mechanism as it scrolls horizontally.

A pair of limit switches 126 and 128 are provided adjacent to the ends of encoder strip 122. Switch 126 is carried by end member 74, and switch 128 is carried by post 111. Switches 126 and 128 form parts of an electronic circuit 130 (FIG. 8) which has a gate or relay 131 which is actuated when either of the switches is actuated. This occurs when follower 110 engages either switch 126 or 128 when the follower 110 and thereby cylinder 64 are at the corresponding ends of their paths of travel. The switches are needed because, while the rotation of shaft 62 can provide infinite vertical position control, horizontal control is limited by the distance the cylinder 64 may travel between the ends of shaft 62.

When cylinder 64 is moved to the left-most position shown in FIG. 3, follower 110 actuates switch 126 which is typically a microswitch having an actuating push button engageable by follower 110. Similarly, switch 128, which is typically a microswitch, has a push button engaged by follower 110 when the cylinder is at its right-most position.

Normally circuit 130 is operative with switches 126 and 128 open. In such a case, the signal outputs from the photo cells 120 are directed along lines 132 to terminals 134 of the mouse inputs of the computer associated with control mechanism 60.

In the quadrature encoding scheme used with mechanism 60, the phase relationship between the signals on lines 132 carries the information representing the direction of linear movements of cylinder 64. Thus, if the phase of the signal on one of the lines 132 leads that of the signal on the other line, the computer decodes leftward movement of follower 110. If the reverse is true, the computer decodes rightward movement of the follower. Circuit 130 illustrates phase relationships of 45 degrees leading or lagging for a total of 90 degrees phase difference between "left" and "right" signals.

Circuit 130 includes a pulse generator 138 whose frequency can be controlled by a variable impedance 140. The output lines 142 and 144 of generator 138 can be coupled to the switches 146 and 148 of gate or relay 131 whose coils 152 and 154 are energized when the corresponding limit switches 126 or 128 are actuated. The generator provides a pair of pulse trains, one lagging the other by 90°. The frequency of these pulses corresponds to the frequency of the output that would be produced by the encoder 92 if cylinder 64 were traveling horizontally at a predetermined, fixed rate. Circuit 130 operates to provide for horizontal scrolling of the cursor when either of switches 126 and 128 is actuated. Thus, circuit 130 enables control mechanism 60 to produce an infinite horizontal pulse output at a fixed rate as long as the cylinder 64 is at either end of its path of travel. This horizontal output is not available to potentiometer-based mechanisms of the type hereinafter described with reference to FIGS. 6A, 6B and 6C.

A binary switch 156 can be provided to control a momentary on-off function of the apparatus with which mechanism 60 is coupled. Switch 156 is mounted at one end of an arm 158 (FIG. 5) pivotally mounted by a pin 160 on a block 162 threadably mounted on a screw 164 which carries a thumb wheel 166, the base 168 of screw 164 being captured and rotatable in base plate 169 of second frame 70. Arm 158 has a short segment 170 which underlies a segment 172 rigid to post 111, segment 170 being on the opposite side of pivot pin 160 from switch 156. Thus, as thumb wheel 166 is rotated in one direction, block 162 moves upwardly with reference to FIG. 5, causing post 111 to rise and thereby cause pivoting of first frame 68 relative to second frame 70, elevating cylinder 64 and shaft 62 to place the cylinder and shaft in a more comfortable position to suit a particular user of the mechanism. Conversely, as the thumb wheel is rotated in the opposite sense, block 162 descends relative to screw 164 that is shown in FIG. 5, this allows the weight of the shaft and cylinder 64 to be lowered because post 130 is lowered, causing pivoting of first frame 68 downwardly relative to second frame 70.

At all positions of block 162 on screw 164, the push button actuator of switch 156 engages the underside of cover plate 86 as shown in FIG. 5. Thus, a downward push by the hand on cylinder 64, on shaft 62, or on either of a pair of end pads 165 (FIG. 3) coupled to frame 68 is sufficient to actuate switch 156, the switch being normally open and is closed when cylinder 64 moves downwardly. Thus, actuation of switch 156 caused by the downward movement of cylinder 164 can be used to enable the mouse input circuit (not shown) of the computer associated with the keyboard on which mechanism 80 is mounted.

The mechanical advantage provided by arm 158 serves to set the travel and pressure limits required by switch 156 to be actuated. Switch closure can be effected with a very short downward travel of cylinder 64, such as 1 mm or less. In any case, the height of the cylinder 64 can be adjusted without changing the relationship of the cylinder to switch 156. Alternatively, thumb wheel 166 may be replaced by a lever and cam height adjustment device. Such a device would provide quick selection of three or four fixed height adjustments.

In the operation of mechanism 60 to control the mouse inputs of a computer, it is assumed that the photo cells 97 associated with encoder 194 and the photo cells 120 associated detector 92 are coupled, respectively, to the vertical and horizontal mouse inputs of the computer. Thus, rotation of shaft 62 in either direction relative to frame 68 will cause vertical movements of the pointer or cursor on the CRT display of the computer. Similarly, horizontal movements of cylinder 64 along shaft 62 will cause horizontal movements of the pointer or cursor, the movements of the pointer or cursor occurring when follower 110 is spaced inwardly from limit switches 126 and 128.

When the follower 110 strikes one of the limit switches, circuit 130 is actuated, causing armatures 146 and 148 of relay 150 to be closed, causing the relaying of a pulse train to the horizontal input of the computer for horizontal scrolling movement of the cursor in a particular direction. Pressing downwardly on shaft 62, cylinder 64 or end pads 165 will actuate switch 156, causing an action of the computer, such as sending a command to act upon the current position of the cursor. Release of downward pressure will open the switch 156. Moreover, the height of the cylinder 64 can be adjusted by manipulating thumb screw 166 to suit the user.

Figure 6C:
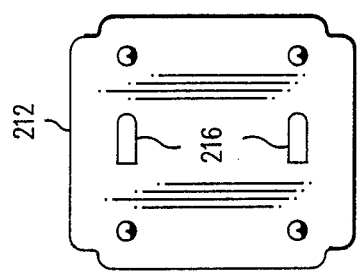
FIG. 6C is a bottom plan view of the follower of FIGS. 6A and 6B.
Figure 6A:
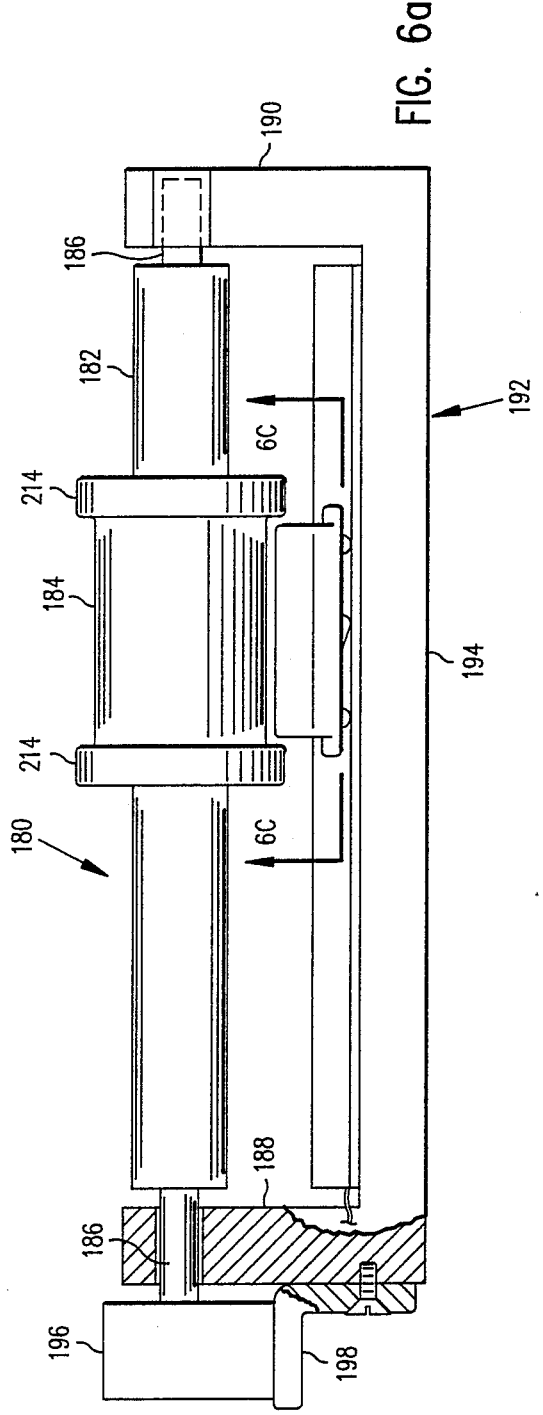
FIG. 6A is a side elevational view of a third embodiment of the mechanism of the present invention.
Figure 6B:
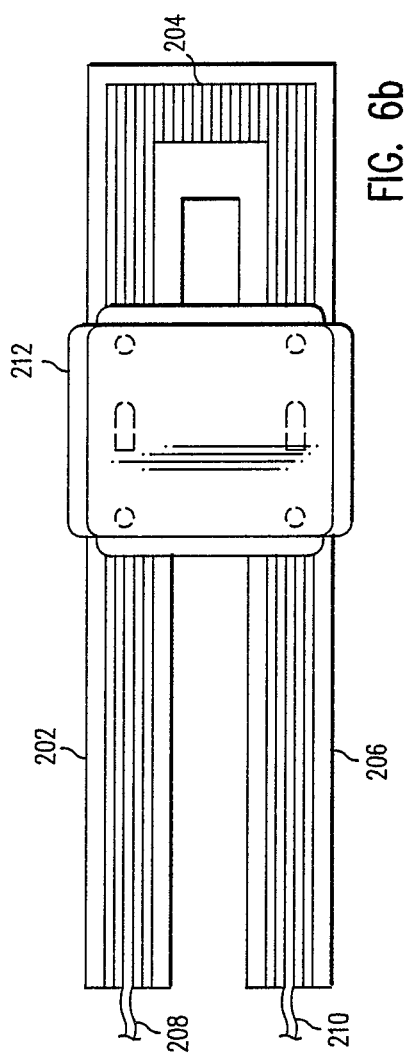
FIG. 6B is a top plan view of a portion of the mechanism of FIG. 6A, showing the linear resistive strip and a follower on the strip.

A third embodiment of the control mechanism of the present invention is broadly denoted by the numeral 180 and is shown FIGS. 6A, 6B and 6C. Mechanism 180 includes a rotatable shaft 182 and a cylinder 184 rotatable with the shaft and movable longitudinally thereof in either direction. The ends 186 of the shaft are rotatably mounted in end members 188 and 190 of a frame 192 having a lower side member 194 interconnecting members 188 and 190. Frame 192 is U-shaped and is adapted to be coupled to another frame, such as a frame similar to frame 78 of the embodiment of FIG. 3. Thus, frame 192 can be readily mounted to a keyboard or other structure to locate the mechanism 180 in an operative position to be used for control purposes in any desired manner.

A rotary potentiometer 196 is carried by bracket 198 on end member 188, potentiometer 196 being coupled to the adjacent end 186 of shaft 182. The potentiometer 196 may be a single-turn device or a multi-turn device. Alternatively, it may be driven through a gear or idler to achieve a suitable turns ratio. A change in the resistive value of potentiometer 196 adjusts a sensing signal for changing the vertical position of a pointer or cursor on a CRT display of a computer associated with mechanism 180.

Detection of the linear movements of cylinder 184 along shaft 182 is achieved by a linear potentiometer 200 comprised of a linear resistor strip and a follower 212, the strip having legs 202, 204 and 206, such legs being electrically conductive and in series with each other. Legs 202 and 206 having end leads 208 and 210 for connection to associated circuitry. Follower 212 is slidably mounted above legs 202 and 206. The follower is mounted between a pair of end ribs 214 of cylinder 184 as shown in FIG. 6A, the follower being movable longitudinally of the shaft 182 with cylinder 184 but being loosely fit between ribs 214 to allow the cylinder to rotate on the shaft while the follower remains in electrical contact with legs 202 and 206.

Follower 212 has a pair of electrical contacts 216 for slidably engaging the resistive strip therebelow, contacts 216 being integral with the body of follower 212 which is of electrically conductive material. Thus, where the contacts 216 engage the resistive strip, follower 212 acts as a shorting bar across the legs 202 and 206. When follower 212 is at the left hand end of its path of travel with reference to FIG. 6B, the effective resistance of the strip is zero and when the follower is at the right hand end of its path of travel, the resistance is at a maximum. The variable resistance output serves as the horizontal output of mechanism 180.

Mechanism 180 is a fixed limit device whose operating limits are defined by the resistive ranges of potentiometers 196 and 200. In all other respects, it provides the advantages of the embodiment shown in FIG. 3 including the use of an on-off switch such as switch 156 (FIG. 5) and adjustment of the height of cylinder 184 with respect to a predetermined reference.

Several different ways of mounting the mechanism of the present invention on a computer keyboard are shown in FIGS. 7A, 7B and 7C. FIG. 7A shows a mechanism denoted by the numeral 220 mounted on the front end 222 of a keyboard 224 in any simple manner such as by screws 226. Mechanism 220 can be of any one of the embodiments of the mechanism described above with respect to FIGS. 2, 3 and 6A.

The mechanism has a frame 228 which is shiftably mounted in a vertical recess 230 formed by a wall 232 and the adjacent front end face of keyboard 224. An on-off switch 234 is mounted at the lower end of recess 230 and is actuated when downward pressure is exerted on the cylinder 236 of mechanism 220 to actuate or enable the encoders of the mechanism to cause the generation of vertical and horizontal output signals to the computer associated with keyboard 224. The mounting scheme of FIG. 7A is used when the mechanism is to be mounted in a minimum amount of space.

FIG. 7B shows another form of mechanism denoted by the numeral 240 having a frame 242 for mounting a cylinder 244 on a shaft (not shown) on the outer end of the frame, the opposite end of the frame being pivotally mounted by a pin 248 on a base 250 attached by screws 252 to one end 254 of a keyboard 256. A vertical screw 258 operated by a thumb wheel 260 raises and lowers frame 242 to suit the comfort of the user of the system. A palm rest 262 is associated with base 250 to provide additional comfort for the user of the system. A momentary contact switch 264 provides an auxiliary switch function. Switch 264 coupled with frame 242 is actuated when slight downward pressure is applied to cylinder 244, transmitting a mouse command to the computer.

FIG. 7C is a view showing an embodiment of the mechanism for use with a DIN-standard low-profile keyboard 270, the mechanism being denoted by the numeral 272 and pivotally carried by a pin 274 on a base 276 having a palm rest 278 extending forwardly from momentary contact switch 280 which is actuated as a function of slight downward pressure on the cylinder 281 or frame 282 of mechanism 272.

I claim:

1. A mechanism for controlling by hand the movement of a cursor or pointer of a computer display in conjunction with a keyboard comprising:
   a longitudinal rotatable shaft;
   a housing for supporting said rotatable shaft;
   a cylindrical member mounted coaxially around a portion of said shaft, said member being slidable axially along said shaft and rotatable about said shaft;
   first and second encoding means coupled to said shaft and cylindrical member respectively for sensing rotation of said shaft and linear movement of said cylindrical member along said shaft and for generating output signals representing the magnitudes and directions of such rotation and linear movement respectively, so that the motions of said shaft and said member enable the adjustment of said output signals with a resultant change in the position of said cursor or pointer.

2. A mechanism as set forth in claim 1 wherein the cylindrical member has a nuber of spaced, annular ribs thereon.

3. A mechanism as set forth in claim 1 wherein the cylindrical member is in frictional engagement with the shaft.

4. A mechanism as in claim 1, wherein said housing comprises a first frame having a longitudinal portion that is substantially parallel with said shaft and having end portions joined to said longitudinal portion to form a U-shaped frame, said shaft being rotatably mounted to said end portions; and a second U-shaped frame pivotably coupled to said first frame; including limit switch means mounted to said first frame; and circuit means coupled to said switch means for providing horizontal control of the travel of said cylindrical member between the ends of said shaft.

5. A mechanism as set forth in claim 4 wherein said switch means is actated and deactuated as a function of the pivotal movement of the first frame relative to the second frame.

6. A mechanism as in claim 4, comprising means for enabling said encoders by depressing one of said frames, said enabling means including an on-off switch that is mounted to said mechanism.

7. A mechanism as set forth in claim 1 wherein the housing comprises a pair of frames, one of the frames being pivotally mounted on the other frame, said shaft being carried on the one frame at a location spaced from the pivotal axis of said one frame, and means for adjusting the pivotal location of the one frame relative to the other frame.

8. A mechanism as in claim 1, wherein said first and second encoding means comprise respectively first and second rotary optical disks, each disk having spaced radial elements for light transmission; light sources disposed adjacent to one surface of each of said disks; and photocells positioned adjacent to the other surface of each disk for generating said output signals in response to light signals sensed by said photocells during rotation of said shaft and/or linear movement of said cylindrical member.

9. A mechanism as set forth in claim 8, wherein one of the disks is coupled directly to said shaft for rotation therewith, and cable and pulley means coupling the other disk to said member on the shaft to cause rotation of the other disk as a function of the linear movement of the member relative to the shaft.

10. A mechanism as in claim 9, further including a tube coupled to said cylindrical member for movement axially with said member along said rotatable shaft, said cable and pulley assembly being coupled between said tube and said optical disk for rotating said disk as said cylindrical member is moved axially relative to said shaft.

11. A mechanism as set forth in claim 10, wherein the member has a pair of axially spaced, annular ribs thereon, and including a follower having a body portion projecting into the space between the ribs and being spaced from the member to allow the member to rotate relative to the follower while permitting the follower to move with the member along a linear path parallel to the longitudinal axis of the shaft.

12. A mmechanism a set forth in claim 11, wherein said follower has a flexible conductor coupled thereto and shiftable therewith.

13. A mechanism as set forth in claim 1, wherein said first encoding means comprises a first potentiometer, and said second encoding means comprises a second potentiometer.

14. A mechanism as set forth in claim 13, wherein said first potentiometer is a rotary device connected to said shaft.

15. A mechanism as set forth in claim 13, wherein the second potentiometer includes an elongated resistive strip on said housing.

16. A mechanism as set forth in claim 15, wherein said resistive strip has a pair of spaced legs and a follower being electrically coupled to the legs and bridging the same, said follower being movable as a function of the movement of the member on the shaft.

17. A mechanism as set forth in claim 13, including a computer having a mouse input, said means for adjusting the first signal and said means for adjusting the second signal being coupled to the mouse input of the computer.

18. A mechanism as set forth in claim 17, wherein the computer has a keyboard, the housing being mounted on the keyboard.

19. A mechanism as set forth in claim 18, wherein the keys of the keyboard are in a number of spaced rows, the shaft being parallel with said row of keys.

20. A mechanism as set forth in claim 19, wherein the keyboard has a front face, the housing being mounted to the keyboard near the front face thereof.

21. A mechanism as in claim 1, including computer display means coupled to said encoding means for displaying the position and movement of said cursor or pointer corresponding to said shaft rotation and linear movement of said cylindrical member.

* * * * *